United States Patent
Guo et al.

(10) Patent No.: US 8,769,627 B1
(45) Date of Patent: Jul. 1, 2014

(54) SYSTEMS AND METHODS FOR VALIDATING OWNERSHIP OF DEDUPLICATED DATA

(75) Inventors: Fanglu Guo, Los Angeles, CA (US); Petros Efstathopoulos, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/314,496

(22) Filed: Dec. 8, 2011

(51) Int. Cl.
*G06F 7/04* (2006.01)
*G06F 11/14* (2006.01)
*G06F 3/06* (2006.01)

(52) U.S. Cl.
CPC ........ *G06F 11/1453* (2013.01); *G06F 11/1464* (2013.01); *G06F 3/067* (2013.01); *G06F 11/1448* (2013.01)
USPC ...................... 726/4; 726/26; 726/32; 726/20

(58) Field of Classification Search
USPC ........................... 726/4, 5, 16, 21, 23, 27–30; 705/901–909, 50–59; 713/159, 161, 713/162, 167, 165, 166, 170, 171–181, 713/190; 380/201, 227–234
See application file for complete search history.

(56) References Cited

U.S. PATENT DOCUMENTS

| | | | |
|---|---|---|---|
| 6,151,676 A * | 11/2000 | Cuccia et al. ................. | 713/176 |
| 7,590,855 B2 * | 9/2009 | Irwin ............................. | 713/181 |
| 7,805,606 B2 * | 9/2010 | Birger et al. .................. | 713/168 |
| 7,882,356 B2 * | 2/2011 | Klemets et al. ............... | 713/172 |
| 7,941,667 B2 * | 5/2011 | Miyazaki et al. ............. | 713/176 |
| 7,987,366 B2 * | 7/2011 | Blom et al. ................... | 713/171 |
| 8,001,584 B2 * | 8/2011 | Lortz et al. ........................ | 726/5 |
| 8,290,915 B2 * | 10/2012 | Anglin ........................... | 707/692 |
| 8,290,972 B1 * | 10/2012 | Deshmukh et al. ............ | 707/758 |
| 8,311,964 B1 * | 11/2012 | Efstathopoulos et al. ...... | 706/45 |
| 8,364,960 B2 * | 1/2013 | Baroffio ........................ | 713/168 |
| 2004/0139028 A1 * | 7/2004 | Fishman et al. ................ | 705/67 |
| 2004/0236819 A1 * | 11/2004 | Anati et al. .................... | 709/200 |
| 2005/0235150 A1 * | 10/2005 | Kaler et al. .................... | 713/168 |
| 2006/0107323 A1 * | 5/2006 | McLean .......................... | 726/23 |
| 2006/0206919 A1 * | 9/2006 | Montgomery et al. ........... | 726/2 |
| 2008/0155260 A1 * | 6/2008 | Perez et al. .................... | 713/169 |
| 2009/0083833 A1 * | 3/2009 | Ziola et al. ........................ | 726/2 |
| 2009/0199009 A1 * | 8/2009 | Chia et al. ..................... | 713/176 |

(Continued)

OTHER PUBLICATIONS

Martin Mulazzani et al.; Dark Clouds on the Horizon: Using Cloud Storage as Attack Vector and Online Slack Space; SBA Research; Sep. 18, 2011.

*Primary Examiner* — Cordelia Zecher
*Assistant Examiner* — Richard McCoy
(74) *Attorney, Agent, or Firm* — ALG Intellectual Property, LLC

(57) ABSTRACT

A computer-implemented method for validating ownership of deduplicated data may include (1) identifying a request from a remote client to store a data object in a data store that already includes an instance of the data object, (2) in response to the request, verifying that the remote client possesses the data object by (i) issuing a randomized challenge to the remote client, the randomized challenge including a random value which, when combined with at least a portion of the data object, produces an authentication token demonstrating possession of the data object and, in response to the randomized challenge, (ii) receiving the authentication token from the remote client; and, in response to receiving the authentication token from the remote client, (3) storing the data object in the data store on behalf of the remote client. Various other methods and systems are also disclosed.

20 Claims, 7 Drawing Sheets

(56) References Cited

U.S. PATENT DOCUMENTS

| | | | |
|---|---|---|---|
| 2010/0332479 A1* | 12/2010 | Prahlad et al. | 707/741 |
| 2011/0040732 A1* | 2/2011 | Anglin et al. | 707/687 |
| 2011/0060882 A1* | 3/2011 | Efstathopoulos | 711/162 |
| 2011/0093439 A1* | 4/2011 | Guo et al. | 707/679 |
| 2011/0145576 A1* | 6/2011 | Bettan | 713/168 |
| 2011/0246721 A1* | 10/2011 | Crisan | 711/130 |
| 2011/0252103 A1* | 10/2011 | Beyer et al. | 709/206 |
| 2011/0258374 A1* | 10/2011 | Pertocelli | 711/104 |
| 2012/0078931 A1* | 3/2012 | Jaquette | 707/758 |
| 2012/0079184 A1* | 3/2012 | Jaquette | 711/111 |
| 2012/0079191 A1* | 3/2012 | Jaquette | 711/114 |
| 2012/0079192 A1* | 3/2012 | Jaquette | 711/114 |
| 2012/0079223 A1* | 3/2012 | Jaquette | 711/162 |
| 2012/0087493 A1* | 4/2012 | Chidambaram et al. | 380/44 |
| 2012/0304281 A1* | 11/2012 | Kang et al. | 726/16 |
| 2013/0024687 A1* | 1/2013 | Lumb | 713/165 |
| 2013/0024694 A1* | 1/2013 | Bichsel et al. | 713/172 |

* cited by examiner

SYSTEMS AND METHODS FOR VALIDATING OWNERSHIP OF DEDUPLICATED DATA

BACKGROUND

Organizations and consumers increasingly use third-party services to store data. Third-party storage services may provide a number of benefits to customers, including flexibility, low capitalization requirements, off-site backups, and centralized access to data.

In order to maximize the efficiency of their storage systems, third-party storage vendors may attempt to deduplicate the data received from their customers. For example, if two customers each wish to store a copy of the same file, a third-party storage vendor may, instead of storing two copies of the file, store a single copy of the file and reference the copy twice. Furthermore, if one customer has already stored a copy of the file, and a second customer wishes to store a copy of the file, the second customer may simply transmit a fingerprint of the file instead of the entire file in order to save the time and/or computing resources ordinarily consumed in a full file transfer. A traditional deduplication system may then identify the fingerprint as corresponding to the file and reference the second customer as having a stored copy of the file within the deduplication system.

Unfortunately, by accepting fingerprints instead of requiring a full file transfer, such traditional third-party storage systems may facilitate illegitimate data acquisition. For example, a user may acquire a fingerprint of a common file (e.g., a video file, an audio file, etc.) without owning a copy of the file. The user may then request that a traditional third-party storage system store a copy of the file on behalf of the user by submitting the fingerprint. The user may then retrieve the full file from the traditional third-party storage system, potentially using the third-party storage system as an efficient piracy platform. Accordingly, the instant disclosure identifies and addresses a need for additional and improved systems and methods for verifying ownership of deduplicated data.

SUMMARY

As will be described in greater detail below, the instant disclosure generally relates to systems and methods for validating ownership of deduplicated data by issuing randomized challenges that require the original files to answer when clients represent ownership of the original files. In one example, a computer-implemented method for validating ownership of deduplicated data may include (1) identifying a request from a remote client to store a data object in a data store that already includes an instance of the data object, (2) in response to the request, verifying that the remote client possesses the data object by (i) issuing a randomized challenge to the remote client, the randomized challenge including a random value which, when combined with at least a portion of the data object, produces an authentication token demonstrating possession of the data object and, in response to the randomized challenge, (ii) receiving the authentication token from the remote client; and, in response to receiving the authentication token from the remote client, (3) storing the data object in the data store on behalf of the remote client.

In some examples, the data store may include a deduplicated data store. In these examples, storing the data object in the data store on behalf of the remote client may include adding a reference associating the remote client with the instance of the data object within the deduplicated data store. In some embodiments, the data store may store data for a plurality of owners, each owner having access only to data marked as stored by the owner. In some examples, the request may include a request to back up the data object to the data store and a fingerprint of the data object to uniquely identify the data object. In these examples, verifying that the remote client possesses the data object may include verifying that the fingerprint is not being used within the request to spoof possession of the data object.

In some examples, the randomized challenge may include requesting a sample of the data object from the remote client, the sample specified at least in part by the random value. In these examples, the authentication token may be based at least in part on the sample. In some embodiments, the randomized challenge may include requesting a hash of the data object generated in combination with the random value. In these embodiments, the authentication token may be based at least in part on the hash. In some examples, the authentication token may be smaller than the data object.

In one example, an additional computer-implemented method for validating ownership of deduplicated data may include (1) identifying a request from a remote client to retrieve a data object from a data store, (2) in response to the request, verifying that the remote client is authorized to retrieve the data object by identifying an ownership relation between the remote client and the data object, the ownership relation having been previously generated on the data store based on (i) issuing a randomized challenge to the remote client, the randomized challenge including a random value which, when combined with at least a portion of the data object, produces an authentication token demonstrating possession of the data object and, in response to the randomized challenge, (ii) receiving the authentication token from the remote client; and, in response to identifying the ownership relation between the remote client and the data object, (3) fulfilling the request by transmitting the data object to the remote client.

In some examples, the data store may include a deduplicated data store. In these examples, the ownership relation may include a reference associating the remote client with an instance of the data object within the deduplicated data store. In some embodiments, the data store may store data for a plurality of owners, each owner having access only to data marked as stored by the owner.

In some embodiments, the randomized challenge may include requesting a sample of the data object from the remote client, the sample specified at least in part by the random value. In these examples, the authentication token may be based at least in part on the sample. In some embodiments, the randomized challenge may include requesting a hash of the data object generated in combination with the random value. In these embodiments, the authentication token may be based at least in part on the hash. In some examples, the authentication token may be smaller than the data object.

In one embodiment, a system for implementing the above-described method may include (1) an identification module programmed to identify a request from a remote client to store a data object in a data store that already includes an instance of the data object, (2) a challenge module programmed to, in response to the request, verify that the remote client possesses the data object by issuing a randomized challenge to the remote client, the randomized challenge including a random value which, when combined with at least a portion of the data object, produces an authentication token demonstrating possession of the data object, (3) an authentication module programmed to, in response to the randomized challenge, receive the authentication token from the remote client, and (4) a storage module programmed to, in response to receiving the authentication token from the remote client, store the data object in the data store on behalf of the remote client. The system may also include at least one processor configured to execute the identification module, the challenge module, the authentication module, and the storage module.

As will be explained in greater detail below, by issuing randomized challenges that require the original files to answer when clients represent ownership of the original files, the systems and methods described herein may ensure that only clients in possession of files can store the files in third-party deduplicated storage systems while still allowing clients that possess the files to store the files without transmitting full copies of the files. Accordingly, these systems and methods may improve the security of third-party deduplicated storage systems while maintaining efficiencies present in third-party storage deduplicated storage systems.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
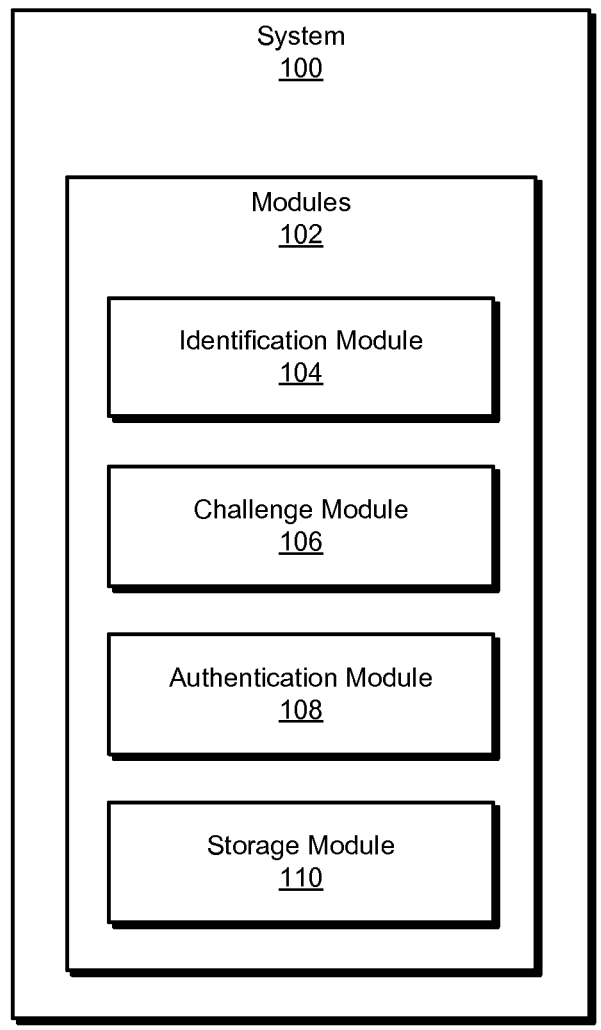
FIG. 1 is a block diagram of an exemplary system for validating ownership of deduplicated data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
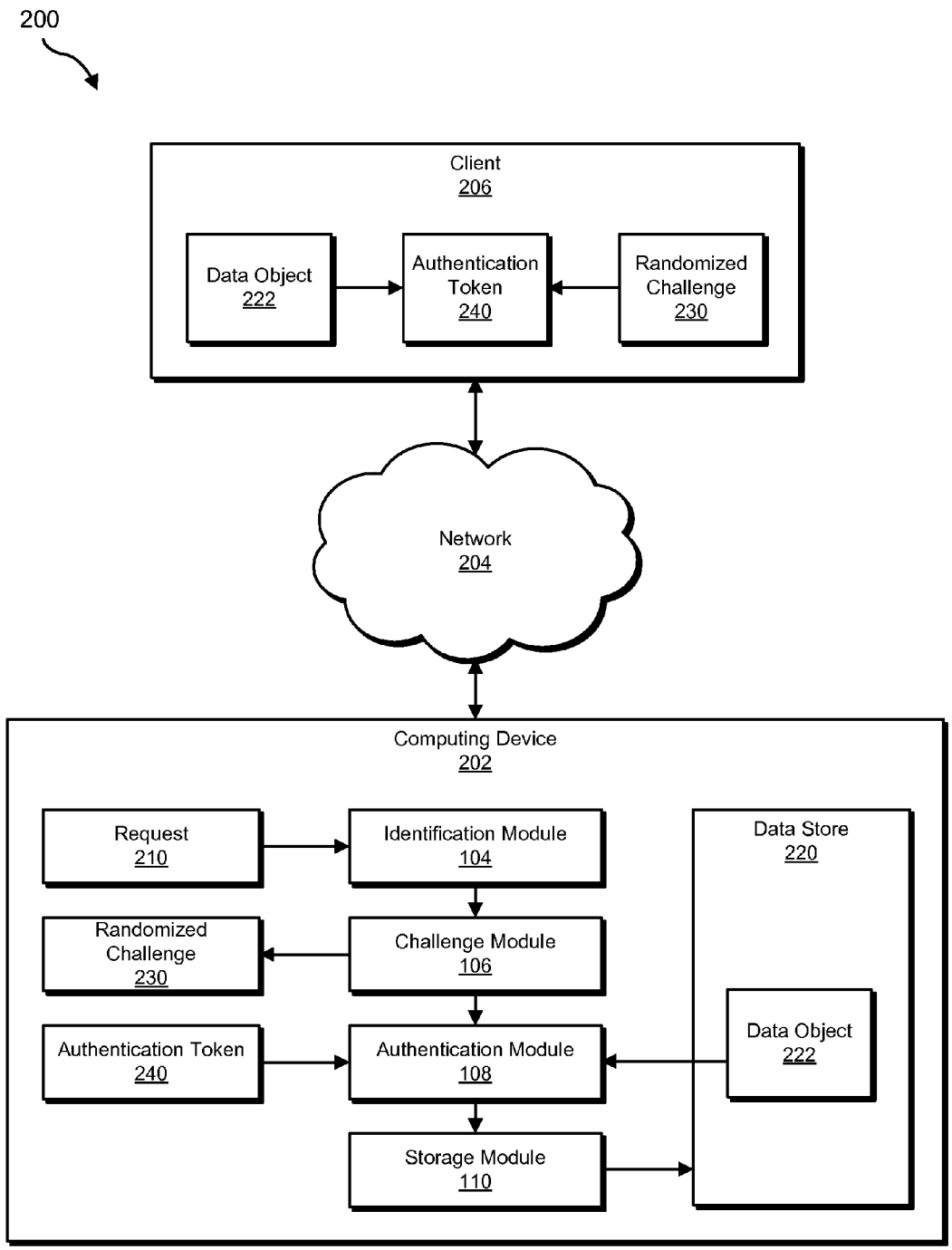
FIG. 2 is a block diagram of an exemplary system for validating ownership of deduplicated data.
Figure 3:
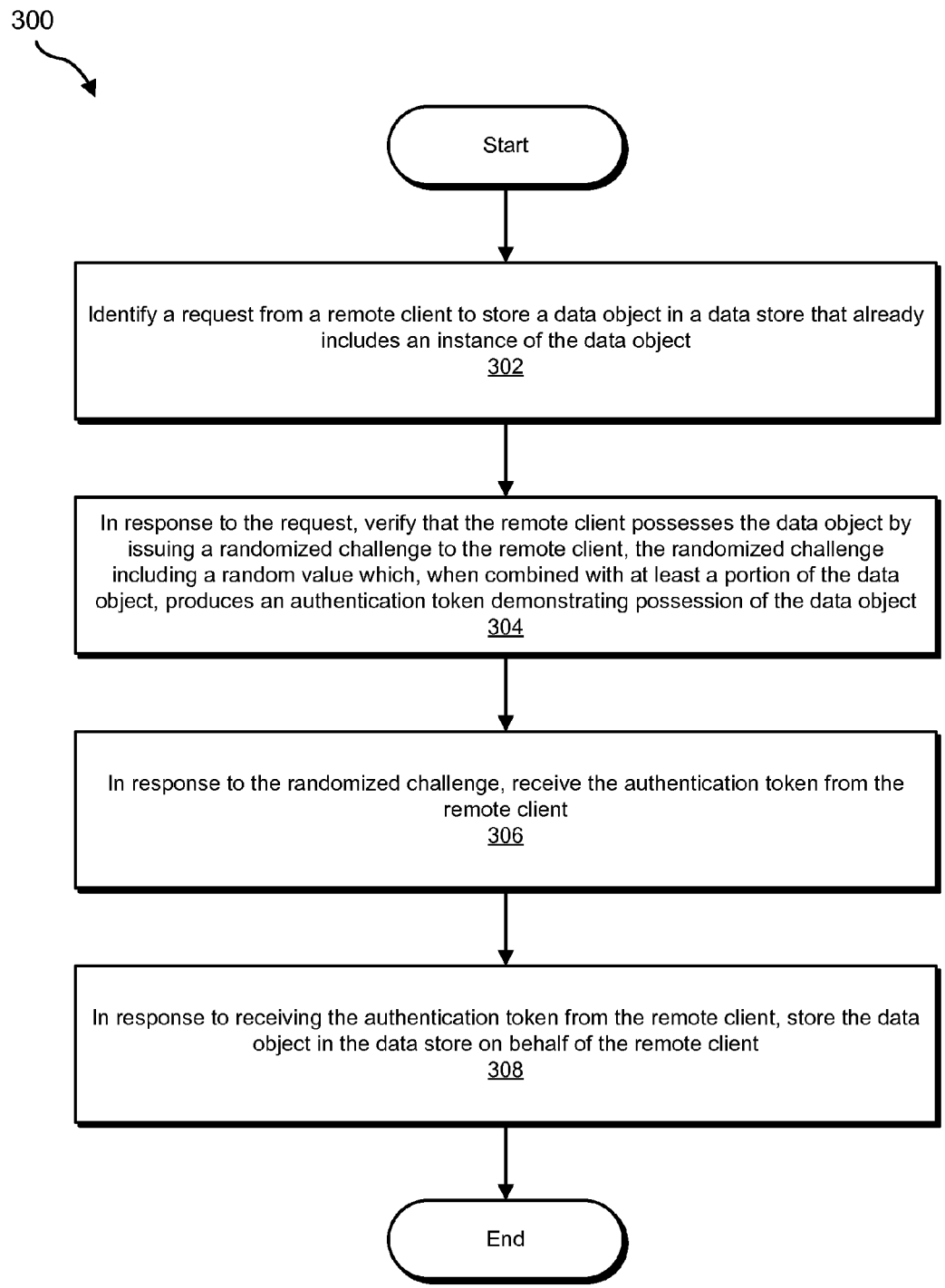
FIG. 3 is a flow diagram of an exemplary method for validating ownership of deduplicated data.
Figure 4:
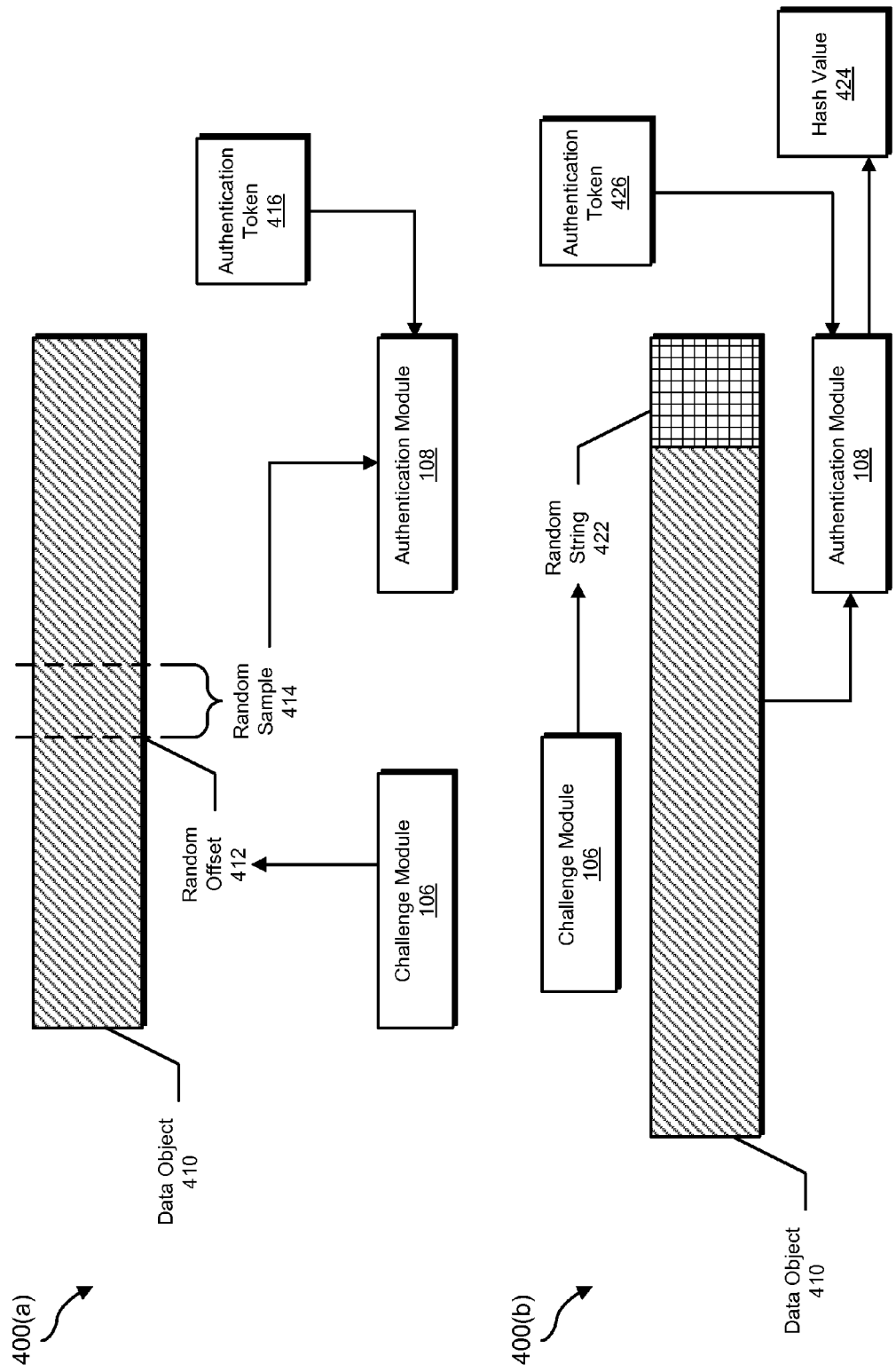
FIG. 4 is a block diagram of exemplary systems for validating ownership of deduplicated data.

The following will provide, with reference to FIGS. 1, 2, and 4, detailed descriptions of exemplary systems for validating ownership of deduplicated data. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for validating ownership of deduplicated data. As illustrated in this figure, exemplary system 100 may include one or more modules 102 for performing one or more tasks. For example, and as will be explained in greater detail below, exemplary system 100 may include an identification module 104 programmed to identify a request from a remote client to store a data object in a data store that already includes an instance of the data object. Exemplary system 100 may also include a challenge module 106 programmed to, in response to the request, verify that the remote client possesses the data object by issuing a randomized challenge to the remote client, the randomized challenge including a random value which, when combined with at least a portion of the data object, produces an authentication token demonstrating possession of the data object.

In addition, and as will be described in greater detail below, exemplary system 100 may include an authentication module 108 programmed to, in response to the randomized challenge, receive the authentication token from the remote client. Exemplary system 100 may also include a storage module 110 programmed to, in response to receiving the authentication token from the remote client, store the data object in the data store on behalf of the remote client. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or client 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client 206 via a network 204. For example, client 206 may attempt to store a data object 222 in a data store 220.

In one embodiment, one or more of modules 102 from FIG. 1 may, when executed by at least one processor of computing device 202, facilitate computing device 202 in validating ownership of deduplicated data. For example, and as will be described in greater detail below, one or more of modules 102 may cause computing device 202 to (1) identify a request (e.g., a request 210) from a remote client (e.g., client 206) to store a data object (e.g., data object 222) in a data store that already includes an instance of the data object (e.g., data store 220, already including an instance of data object 222), (2) in response to the request, verifying that the remote client possesses the data object by (i) issuing a randomized challenge (e.g., a randomized challenge 230) to the remote client, the randomized challenge including a random value which, when combined with at least a portion of the data object, produces an authentication token (e.g., an authentication token 240) demonstrating possession of the data object and, in response to the randomized challenge, (ii) receiving the authentication token from the remote client (e.g., receiving authentication token 240 from client 206); and, in response to receiving the authentication token from the remote client, (3) storing the data object in the data store on behalf of the remote client (e.g., by referencing client 206 as an owner of an instance of data object 222 without requiring client 206 to transfer a copy of data object 222 to computing device 202).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Client 206 generally represents any type or form of computing device that is capable of storing data remotely, backing up data remotely, retrieving data from a remote system, and/or restoring data from a remote system. Examples of client 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and client 206.

Data store 220 may represent portions of a single storage or computing device or a plurality of storage or computing devices. For example, data store 220 may represent a portion of computing device 202 in FIG. 2, computing system 610 in FIG. 6, and/or portions of exemplary network architecture 700 in FIG. 7. Alternatively, data store 220 in FIG. 1 may represent one or more physically separate devices capable of being accessed by a computing device, such as computing device 202 in FIG. 2, computing system 610 in FIG. 6, and/or portions of exemplary network architecture 700 in FIG. 7.

FIG. 3 is a flow diagram of an exemplary computer-implemented method 300 for validating ownership of deduplicated data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a request from a remote client to store a data object in a data store that already includes an instance of the data object. For example, at step 302 identification module 104 may, as part of computing device 202 in FIG. 2, identify request 210 from client 206 to store data object 222 in data store 220.

As used herein, the phrase "data object" may refer to any for or type of data entity and/or digital information. For example, the phrase "data object" may refer to a file, an image, etc. In some examples, the data object may include copyrighted data. For, the data object may include a multimedia file (e.g., a video file, an audio file, etc.). Additionally or alternatively, the data object may include one or more application files. In some examples, identification module 104 may determine that the request refers to a file containing copyrighted data and instruct the systems described herein to perform one or more of the steps described herein in response to determining that the request refers to a file containing copyrighted data. Likewise, identification module 104 may determine that the request refers to a file containing sensitive and/or protected data and instruct the systems described herein to perform one or more of the steps described herein in light of the determination.

As used herein, the term "data store" may refer to any volume, storage device, array of storage devices, cluster of storage devices, and/or storage system for storing data. In some examples, the data store may include a deduplicated data store (e.g., a data store configured to deduplicate data and/or store deduplicated data). As used herein, the phrase "deduplicated data" generally refers to data stored by storage systems that reduce redundant data by referencing a single instance of a data unit (e.g., a data segment, a file, etc.) multiple times rather than separately storing each instance of the data unit. In some examples, the deduplicated data system may not fully deduplicate stored data. For example, the systems and methods described herein may reduce ten instances of a unit of data to three stored instances instead of one stored instance.

In some examples, the data store may store data for a plurality of owners, each owner having access only to data marked as stored by the owner. For example, the instance of the data object already stored within the deduplicated data system may represent data stored on behalf of recognized owners of the data object. In this example, only the recognized owners may access the data object from the deduplicated data system. Accordingly, the remote client requesting to store the data object in the data store may entail the remote client requesting access to the instance of the data object already stored within the deduplicated data system.

Identification module 104 may identify the request in any of a variety of formats and with any of a variety of content. For example, the request may include any time of query, instruction, message, and/or command related to storing the data object in the data store. In some examples, the request may include a request to back up the data object to the data store. Additionally or alternatively, the request may include a request to move the data object to and/or store a copy of the data object in the data store. In some examples, the request may include an identification of the data object (e.g., so that a deduplication system may identify an instance of the data object within the data store without requiring the client to upload the entire data object). For example, the request may include a fingerprint of the data object to uniquely identify the data object. The term "fingerprint," as used herein, may refer to any type of fingerprint, hash function output, checksum, and/or digital signature that corresponds to and/or uniquely identifies a data object.

As mentioned earlier, the data store may store and/or reference deduplicated data. Accordingly, the request from the remote client to store the data object in the data store may entail a request to ensure that at least one instance of the data object remains available in the data store for access by the remote client.

Returning to FIG. 3, at step 304 one or more of the systems described herein may, in response to the request, verify that the remote client possesses the data object by issuing a randomized challenge to the remote client. The randomized challenge may include a random value which, when combined with at least a portion of the data object, produces an authentication token demonstrating possession of the data object. For example, at step 304 challenge module 106 may, as part of computing device 202 in FIG. 2, issue randomized challenge 230 to client 206 (e.g., so that client 206 may generate authentication token 240 based on data object 222 and random challenge 230).

As mentioned earlier, in some examples the request may include a fingerprint uniquely identifying the data object. In these examples, challenge module 106 and/or authentication module 108 may verify that the remote client possess the data object by verifying that the fingerprint is not being used within the request to spoof possession of the data object. Accordingly, by issuing the randomized challenge to the remote client, challenge module 106 may verify that the fingerprint is not being used within the request to spoof possession of the data object.

Challenge module 106 may procure the random value in any suitable manner. For example, challenge module 106 may use a random number generator to select the random value. In some examples, the random value may simply be a value that is random from the perspective of the remote client (e.g., a value that would be impractical for a user of the remote client to predict). In some examples, the random value may be random in the sense challenge module 106 may choose the random value from a variety of possible values (e.g., rather than always choosing the same value) without allowing the remote client to influence the selection. In some examples, challenge module 106 may select the random value within a constrained range (e.g., the size of the data object).

The randomized challenge may include any of a variety of challenges for the remote client to meet. For example, the randomized challenge may include requesting a sample of the data object from the remote client, the sample being specified at least in part by the random value. For example, the randomized challenge may use the random value as a random offset at which the sample must start. In some examples, the randomized challenge may also include a specified (and, e.g., randomly selected) length required for the sample.

FIG. 4 illustrates exemplary systems 400(a) and 400(b) for validating ownership of deduplicated data. As shown in FIG. 4, exemplary system 400(a) may include a data object 410 (e.g., stored within a deduplicated data store). Using FIG. 4 as an example, at step 304 challenge module 106 may select a random offset 412 to determine a random sample 414. In this example, challenge module 106 may issue a challenge specifying random offset 412 to a remote client (e.g., to test if the remote client can produce random sample 414).

In some examples, the randomized challenge may include requesting a hash of the data object generated in combination with the random value. For example, challenge module 106 may issue the randomized challenge to the remote client requiring the remote client to generate a hash (e.g., using a predetermined hash function) of a version of the data object with the random value appended. Using FIG. 4 as an example, in exemplary system 400(b) challenge module 106 may, at step 304, select a random string 422 to append to data object 410. Challenge module 106 may then issue a challenge including random string 422 to a remote client, requiring the remote client to generate a hash of data object 410 with random string 422 appended.

After receiving the randomized challenge, the remote client may apply the randomized challenge to a copy of the data object accessible to the remote client in order to generate the authentication token. For example, the remote client may take a sample of the data object as specified by the randomized challenge. The remote client may then use the sample as an authentication token. Additionally or alternatively, the remote client may generate a hash of a combination of the data object and a random string as specified by the randomized challenge. The remote client may then use the hash as an authentication token.

In some examples, the authentication token may be smaller than the data object. In one example, the data object may include 4 gigabytes of data and the authentication token may include 1 kilobyte of data. As described herein, by allowing the remote client to transmit the authentication token instead of the entire data object to demonstrate possession of the data object, the systems and methods described herein may save time and/or computing resources (e.g., I/O resources, network resources, etc.).

Returning to FIG. 3, at step 306 one or more of the systems described herein may, in response to the randomized challenge, receive the authentication token from the remote client. For example, at step 306 authentication module 108 may, as part of computing device 202 in FIG. 2, receive authentication token 204 from client 206. Using FIG. 4 in an additional example, at step 306 authentication module 108 may, as a part of system 400(a), receive an authentication token 416 from the remote client. Additionally or alternatively, at step 306 authentication module 108 may, as a part of system 400(b), receive an authentication token 426 from the remote client.

In some examples, authentication module 108 may also complete the randomized challenge issued to the remote client. For example, the randomized challenge may include a challenge to take a random sample from the data object. Accordingly, authentication module 108 may take the random sample from the instance of the data object in the data store in order to compare the random sample with the authentication token received from the remote client. Using FIG. 4 as an example, authentication module 108 may, as a part of computing system 400(a), take random sample 414 from data object 410 based on random offset 412. Authentication module 108 may then compare random sample 414 to authentication token 416 to check that the remote client was able to produce the same random sample 414 based on random offset 412 from an instance of data object 410 in possession of the remote client. In another example, the randomized challenge may include a challenge to calculate a hash of the data object in combination with a random value. Accordingly, authentication module 108 may calculate the hash of the data object in combination with the random value (e.g., using the same hash function as used by the remote client) in order to compare the hash with the authentication token received from the remote client. Using FIG. 4 as an example, authentication module 108 may, as a part of computing system 400(b), compute a hash value 424 from data object 410 with random string 422 appended. Authentication module 108 may then compare hash value 424 to authentication token 426 to check that the remote client was able to produce the same hash value 424 based on random string 422 from an instance of data object 410 in possession of the remote client.

Returning to FIG. 3, at step 308 one or more of the systems described herein may, in response to receiving the authentication token from the remote client, store the data object in the data store on behalf of the remote client. For example, at step 308 storage module 110 may, as part of computing device 202 in FIG. 2, store data object 222 in data store 220 on behalf of client 206.

Storage module 110 may store the data object in the data store on behalf of the remote client in any of a variety of ways. For example, as mentioned earlier, the data store may include a deduplicated data store. In this example, because the data store already includes an instance of the data object, storage module 110 may store the data object in the data store on behalf of the remote client by adding a reference associating the remote client (e.g., by associating a user of the remote client) with the instance of the data object within the deduplicated data store. For example, storage module 110 may store the data object on behalf of the remote client by storing metadata for the data object in a remote volume, drive, and/or directory belonging to a user of the remote client and referencing, within the metadata, the instance of the data object within the deduplicated data store. In some examples, storage module 110 may be configured to store some or all data for distinct users as separate instances (e.g., in order to provide better performance, security, and/or reliability than a full deduplication system). In these examples, storage module 110 may store the data object in the data store on behalf of the remote client by copying the instance of the data object already within the data store for the use of the remote client. After step 308, method 300 may terminate.

Figure 5:
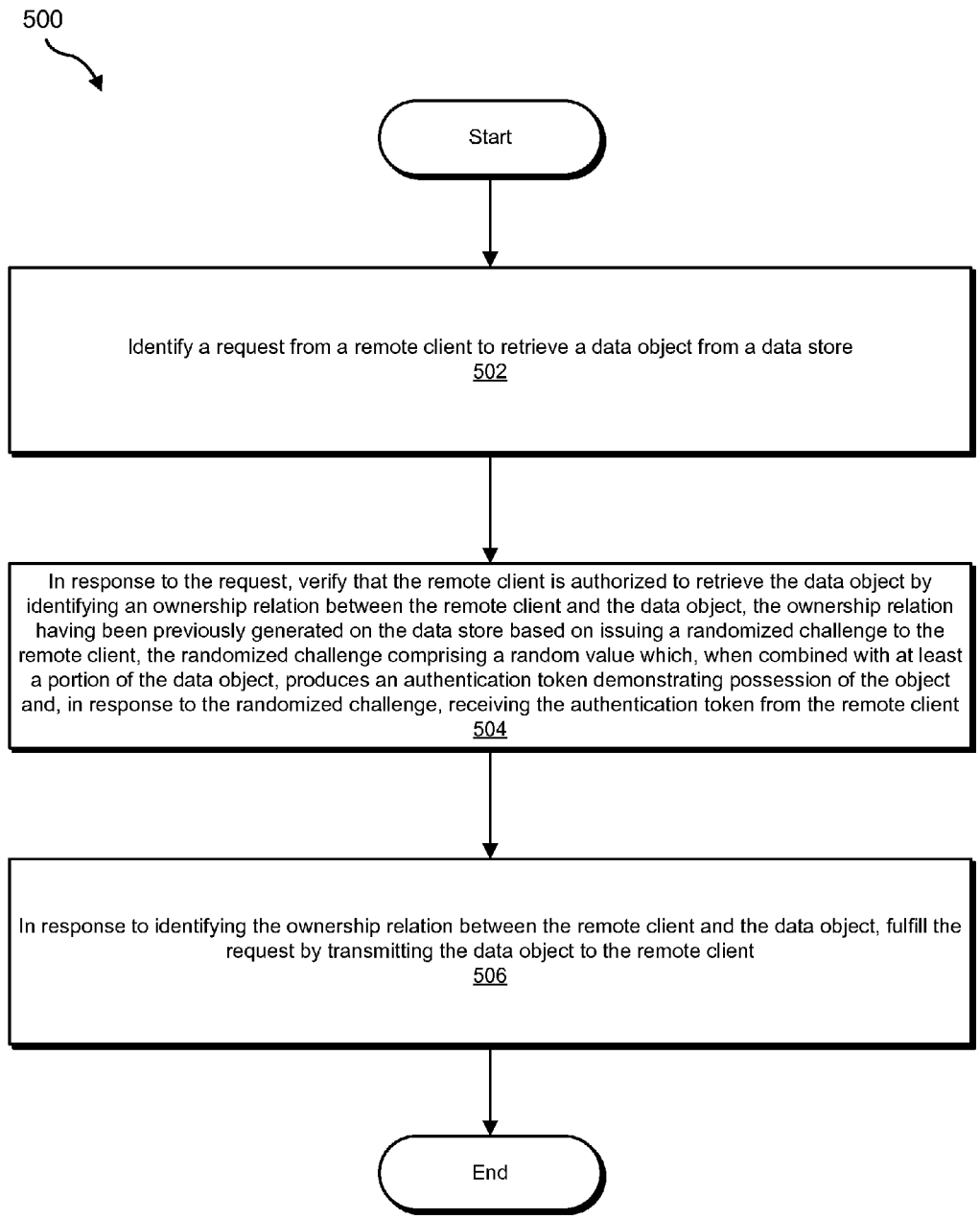
FIG. 5 is a flow diagram of an exemplary method for validating ownership of deduplicated data.

FIG. 5 is a flow diagram of an exemplary computer-implemented method 500 for validating ownership of deduplicated data. The steps shown in FIG. 5 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As shown in FIG. 5, at step 502 one or more of the systems described herein may identify a request from a remote client to retrieve a data object from a data store. For example, at step 502 identification module 104 may, as part of computing device 202 in FIG. 2, identify a request from client 206 to retrieve data object 222 from data store 220.

At step 504 one or more of the systems described herein may, in response to the request, verify that the remote client is authorized to retrieve the data object by identifying an ownership relation between the remote client and the data object, the ownership relation having previously been generated on the data store based on (1) issuing a randomized challenge to the remote client and, in response to the randomized challenge, (2) receiving the authentication token from the remote client. The randomized challenge may include a random value which, when combined with at least a portion of the data object, produces an authentication token demonstrating possession of the data object. For example, at step 504 authentication module 108 may, as part of computing device 202 in FIG. 2, verify that client 206 is authorized to retrieve data object 222 by identifying an ownership relation between client 206 and data object 222.

In some examples, the data store may include a deduplicated data store. In these examples, the ownership relation may include a reference associating the remote client with an instance of the data object within the deduplicated data store. For example, the ownership relation may include a file stored on behalf the remote client (e.g., on behalf of a user of the remote client) in the data store, where the file is a deduplicated file that references a single instance of the file stored for reference for multiple copies of the file. In some examples, the data store may store data for a plurality of owners, each owner having access only to data marked as stored by the owner. Accordingly, multiple owners may store the data object within the data store within separate directories within the data store, each directory only accessible to its respective owner. Nevertheless, the copy of the data object stored in each directory may be stored by a deduplication system of the data store as a single instance.

In some embodiments, the randomized challenge may include requesting a sample of the data object from the remote client, the sample specified at least in part by the random value. In these examples, the authentication token may be based at least in part on the sample. In some embodiments, the randomized challenge may include requesting a hash of the data object generated in combination with the random value. In these embodiments, the authentication token may be based at least in part on the hash. In some examples, the authentication token may be smaller than the data object. Generally, the randomized challenge and the authentication token may have been generated, issued, and received in any manner as described earlier in the discussion of FIG. 3.

Returning to FIG. 5, at step 506 one or more of the systems described herein may, in response to identifying the ownership relation between the remote client and the data object, fulfill the request by transmitting the data object to the remote client. For example, at step 506 storage module 110 may, as part of computing device 202 in FIG. 2, fulfill the request by transmitting data object 222 to client 206.

Storage module 110 may perform step 506 in any suitable context. For example, an instance of the data object on remote client may have been lost and/or become corrupted. In this example, storage module 110 may transmit the data object to the remote client to restore the data object to the remote client. After step 506, method 500 may terminate.

As explained above, by issuing randomized challenges that require the original files to answer when clients represent ownership of the original files, the systems and methods described herein may ensure that only clients in possession of files can store the files in third-party deduplicated storage systems while still allowing clients that possess the files to store the files without transmitting full copies of the files. Accordingly, these systems and methods may improve the security of third-party deduplicated storage systems while maintaining efficiencies present in third-party storage deduplicated storage systems.

Figure 6:
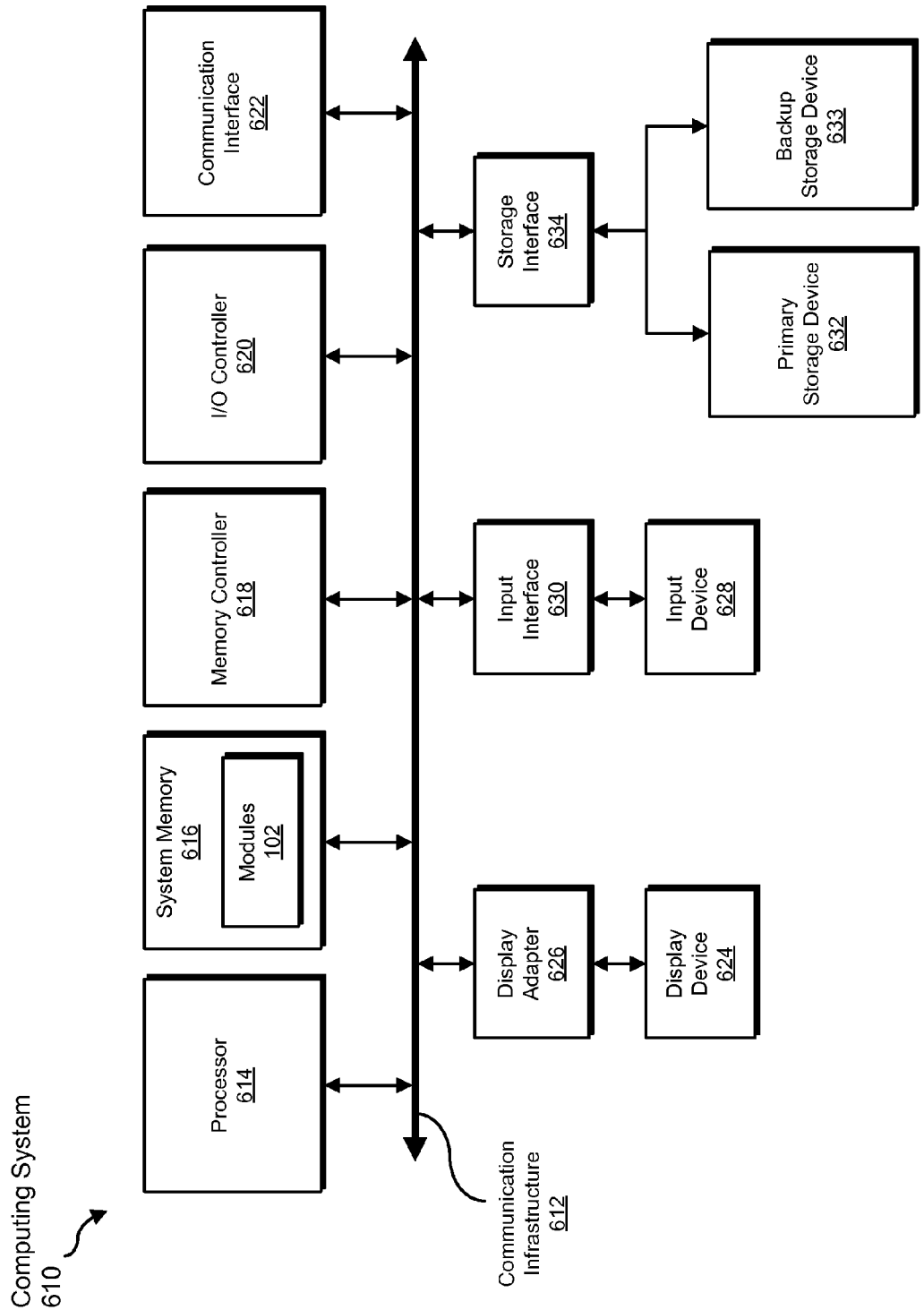
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, verifying, issuing requesting, receiving, adding, and fulfilling steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
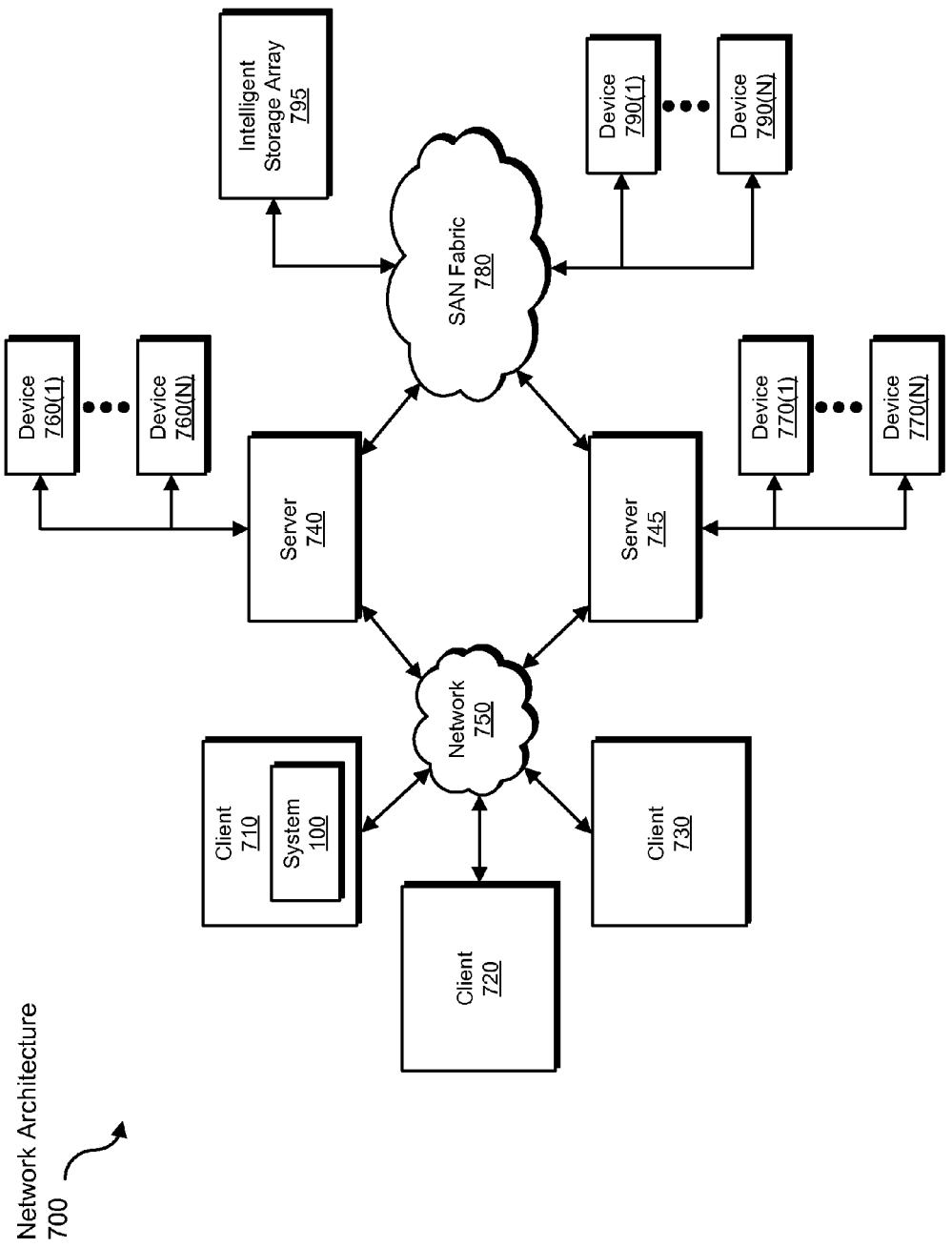
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, verifying, issuing requesting, receiving, adding, and fulfilling steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760 (1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for validating ownership of deduplicated data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for validating ownership of deduplicated data.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for validating ownership of deduplicated data, at least a portion of the method being performed by a computing device comprising at least one processor, the method comprising:
    identifying a request from a remote client to store a data object in a data store that already comprises an instance of the data object;
    in response to the request, verifying that the remote client possesses the data object by issuing, to the remote client:
        a random offset;
        a random value that is different than the random offset;
        a randomized challenge, the randomized challenge comprising a request for an authentication token demonstrating possession of the data object, the authentication token comprising a hash of a combination of the random value and a random sample of the data object, wherein the random sample is based on the random offset;
    in response to the randomized challenge, receiving the authentication token from the remote client;
    in response to receiving the authentication token from the remote client, storing the data object in the data store on behalf of the remote client.

2. The computer-implemented method of claim 1, wherein:
    the data store comprises a deduplicated data store;
    storing the data object in the data store on behalf of the remote client comprises adding a reference associating the remote client with the instance of the data object within the deduplicated data store.

3. The computer-implemented method of claim 1, wherein the hash is generated by hashing, using a predetermined hash function, the random sample of the data object with the random value appended.

4. The computer-implemented method of claim 1, wherein the random value is procured using a random number generator.

5. The computer-implemented method of claim 1, wherein the authentication token is smaller than the data object.

6. The computer-implemented method of claim 1, wherein:
    the data store stores data for a plurality of owners;
    an owner within the plurality of owners has access only to data marked as stored by the owner.

7. The computer-implemented method of claim 1, wherein:
    the request to store the data object in the data store comprises a request to back up the data object to the data store;
    the request comprises a fingerprint of the data object to uniquely identify the data object;
    verifying that the remote client possesses the data object comprises verifying that the fingerprint is not being used within the request to spoof possession of the data object.

8. A computer-implemented method for validating ownership of deduplicated data, at least a portion of the method being performed by a computing device comprising at least one processor, the method comprising:
    identifying a request from a remote client to retrieve a data object from a data store;
    in response to the request, verifying that the remote client is authorized to retrieve the data object by identifying an ownership relation between the remote client and the data object, the ownership relation having been previously generated on the data store based on:
        issuing a random offset to the remote client;
        issuing a random value that is different than the random offset to the remote client;
        issuing a randomized challenge to the remote client, the randomized challenge comprising a request for an authentication token demonstrating possession of the data object, the authentication token comprising a hash of a combination of the random value and a random sample of the data object, wherein the random sample is based on the random offset;
        in response to the randomized challenge, receiving the authentication token from the remote client;
    in response to identifying the ownership relation between the remote client and the data object, fulfilling the request from the remote client to retrieve the data object from the data store by transmitting the data object to the remote client.

9. The computer-implemented method of claim 8, wherein:
    the data store comprises a deduplicated data store;
    the ownership relation comprises a reference associating the remote client with an instance of the data object within the deduplicated data store.

10. The computer-implemented method of claim 8, wherein the hash is generated by hashing, using a predetermined hash function, the random sample of the data object with the random value appended.

11. The computer-implemented method of claim 8, wherein the random value is procured using a random number generator.

12. The computer-implemented method of claim 8, wherein the authentication token is smaller than the data object.

13. The computer-implemented method of claim 8, wherein:

the data store stores data for a plurality of owners;

an owner within the plurality of owners has access only to data marked as stored by the owner.

14. A system for validating ownership of deduplicated data, the system comprising:
- an identification module programmed to identify a request from a remote client to store a data object in a data store that already comprises an instance of the data object;
- a challenge module programmed to, in response to the request, verify that the remote client possesses the data object by issuing, to the remote client:
  - a random offset;
  - a random value that is different than the random offset;
  - a randomized challenge, the randomized challenge comprising a request for an authentication token demonstrating possession of the data object, the authentication token comprising a hash of a combination of the random value and a random sample of at lest a portion of the data object, wherein the random sample is based on the random offset;
- an authentication module programmed to, in response to the randomized challenge, receive the authentication token from the remote client;
- a storage module programmed to, in response to receiving the authentication token from the remote client, store the data object in the data store on behalf of the remote client;
- at least one processor configured to execute the identification module, the challenge module, the authentication module, and the storage module.

15. The system of claim 14, wherein:
the data store comprises a deduplicated data store;
the storage module is programmed to store the data object in the data store on behalf of the remote client by adding a reference associating the remote client with the instance of the data object within the deduplicated data store.

16. The system of claim 14, wherein the hash is generated by hashing, using a predetermined hash function, the random sample of the data object with the random value appended.

17. The system of claim 14, wherein the challenge module procures the random value using a random number generator.

18. The system of claim 14, wherein the authentication token is smaller than the data object.

19. The system of claim 14, wherein:
the data store stores data for a plurality of owners,
an owner within the plurality of owners has access only to data marked as stored by the owner.

20. The system of claim 14, wherein:
the request to store the data object in the data store comprises a request to back up the data object to the data store;
the request comprises a fingerprint of the data object to uniquely identify the data object;
the challenge module is programmed to verify that the remote client possesses the data object by verifying that the fingerprint is not being used within the request to spoof possession of the data object.

* * * * *

UNITED STATES PATENT AND TRADEMARK OFFICE
CERTIFICATE OF CORRECTION

PATENT NO.        : 8,769,627 B1                                        Page 1 of 1
APPLICATION NO.   : 13/314496
DATED             : July 1, 2014
INVENTOR(S)       : Fanglu Guo and Petros Efstathopoulos It is certified that error appears in the above-identified patent and that said Letters Patent is hereby corrected as shown below:

In the Claims

Claim 14, column 17, lines 14 to 20, should read:
a randomized challenge, the randomized challenge comprising a request for an authentication token demonstrating possession of the data object, the authentication token comprising a hash of a combination of the random value and a random sample of at least a portion of the data object, wherein the random sample is based on the random offset;

Signed and Sealed this
Ninth Day of December, 2014

Michelle K. Lee
*Deputy Director of the United States Patent and Trademark Office*